United States Patent
Modarresi

(10) Patent No.: US 9,609,074 B2
(45) Date of Patent: Mar. 28, 2017

(54) PERFORMING PREDICTIVE ANALYSIS ON USAGE ANALYTICS

(71) Applicant: Adobe Systems Incorporated, San Jose, CA (US)

(72) Inventor: Kourosh Modarresi, Los Altos, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 285 days.

(21) Appl. No.: 14/308,311

(22) Filed: Jun. 18, 2014

(65) Prior Publication Data

US 2015/0370863 A1    Dec. 24, 2015

(51) Int. Cl.
G06F 17/30 (2006.01)
H04L 29/08 (2006.01)
G06Q 10/04 (2012.01)
G06Q 30/02 (2012.01)

(52) U.S. Cl.
CPC ........ H04L 67/22 (2013.01); G06F 17/30536 (2013.01); G06Q 10/04 (2013.01); G06F 17/30539 (2013.01); G06F 17/30551 (2013.01); G06Q 30/0202 (2013.01)

(58) Field of Classification Search
CPC .... G06Q 30/02; G06Q 30/0202; G06Q 10/04; G06Q 30/0283; G06F 17/30539; G06F 17/30551; G06F 19/24; G06F 17/30536; G06F 17/3086
USPC ............... 707/722, 723, 737, 749, 752, 754; 705/7.31, 7.29; 706/12, 21
See application file for complete search history.

(56) References Cited

U.S. PATENT DOCUMENTS

| | | | | |
|---|---|---|---|---|
| 6,125,105 A * | 9/2000 | Edwards | ............... | G06Q 10/06 370/230 |
| 7,813,544 B2 * | 10/2010 | Fukaya | ............... | G06K 9/00248 382/118 |
| 8,374,904 B2 * | 2/2013 | Shan | ............... | G06Q 40/06 705/7.29 |
| 8,572,011 B1 * | 10/2013 | Sculley, II | ............... | G06N 99/005 706/13 |
| 2008/0306903 A1 * | 12/2008 | Larson | ............... | G06F 17/30536 707/999.002 |
| 2009/0144209 A1 * | 6/2009 | Miyakawa | ............... | G06F 19/24 706/12 |
| 2014/0222653 A1 * | 8/2014 | Takayasu | ............... | G06Q 30/0283 705/37 |

(Continued)

*Primary Examiner* — Dangelino Gortayo
(74) *Attorney, Agent, or Firm* — Keller Jolley Preece

(57) ABSTRACT

Methods for predicting future data based on time-dependent data with increased accuracy include generating resampled datasets from a base dataset having at least one time dependent characteristic. Generating the resampled datasets includes randomly resampling data points in the base dataset to increase a pool of data for predicting future data while at least partially maintaining one or more time dependent characteristics of the base dataset. One or more embodiments apply a modified bootstrapping algorithm to the base dataset to generate the resampled datasets. Predicting the future data includes applying a time series algorithm to the resampled datasets to generate a predicted future dataset with improved accuracy by utilizing the time dependent characteristic maintained in the resampled datasets.

20 Claims, 8 Drawing Sheets

(56) References Cited

U.S. PATENT DOCUMENTS

2015/0154619 A1\* 6/2015 Grichnik ............ G06Q 30/0202
705/7.31

\* cited by examiner

PERFORMING PREDICTIVE ANALYSIS ON USAGE ANALYTICS

CROSS REFERENCE TO RELATED APPLICATIONS

N/A.

BACKGROUND

1. Technical Field

One or more embodiments relate generally to systems and methods for predictive analysis. More specifically, one or more embodiments relate to systems and methods of predicting a future dataset from a past dataset.

2. Background and Relevant Art

Some conventional tracking software monitors user interactions with media (e.g., hits to a website, application downloads, software error reporting). Analytics reports often detail the user interactions by showing the history of user interactions, including trends and notable events. In web applications, website developers and marketing personnel can use the analytics to predict future user traffic based on the number of hits or views a particular webpage has received. Predicting future traffic can play an important role in making development and marketing decisions for web applications and backend support.

In order to predict website traffic and other user interactions, a large amount of data may be required to produce sufficiently accurate predictions. Some methods of obtaining the data required to produce an accurate prediction include collecting previously sampled data. For example, a system can pull a large amount of actual analytics data sampled for a particular application and use the actual data to generate a prediction. Pulling a large amount of analytics data to produce an accurate predictive analysis, however, can use a large amount of processing power and/or processing time, resulting in an impractical solution.

Additionally, the available set of analytics data may not be available or may not contain enough data points to produce an accurate predictive analysis. Additionally, the pool of available data may include sensitive or confidential information. Using a limited pool of data for generating a prediction can result in inaccurate or otherwise unsatisfactory predictions.

Some methods use a small set of actual analytics data to generate additional data points for use in predictive analysis. For example, some methods of predicting data use random resampling of collected data to increase the amount of data available for generating predictions. While purely random sampling in a conventional resampling process can provide good predictive results based on data that has no time dependent characteristics, a purely random sampling process does not retain trend information, seasonal characteristics, or other time dependent relationships between data points. Thus, using random resampling to predict time-dependent events can lead to unsatisfactory results.

These and other disadvantages may exist with respect to conventional data prediction techniques.

SUMMARY

One or more embodiments provide benefits and/or solve one or more of the foregoing or other problems in the art with systems and methods for predicting future data. For example, one or more embodiments involve predicting data corresponding to future data using a base dataset. Specifically, one or more embodiments generate resampled datasets from the base dataset using a resampling process that at least partially maintains one or more time dependent characteristics of the base dataset. Generating the resampled datasets from a base dataset increases the available data for predicting future data points. Thus, one or more embodiments can produce a large pool of data that can be used to predict future events while taking into account the time relationship of the data from the base dataset.

After generating the resampled datasets, one or more embodiments predict future data by applying a time series algorithm to the resampled datasets. The time series algorithm can give different weights to the data points in a resampled dataset to produce a possible future data point for each future time period. Specifically, one or more embodiments produce a possible future data point for each future time period from each of the resampled datasets. One or more embodiments generate a predicted future data point for a particular future time period by averaging the possible future data points corresponding to the particular future time period.

The methods and systems disclosed herein can provide improvements in predictive analysis by increasing the amount of data used to predict future data while retaining time dependent characteristics of the base dataset. In particular, maintaining the order of chronological data points when resampling the base dataset to create the resampled datasets can at least partially inform the selection process during resampling. In some embodiments, particularly with regard to time series data, at least partially informed, random resampling can provide a better pool of data points for predicting future data than purely random resampling.

Additional features and advantages of one or more embodiments of the present invention will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features may be obtained, a more particular description of the subject matter briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting in scope, various embodiments will be described and explained with additional specificity and detail through the use of the accompanying drawings in which.

DETAILED DESCRIPTION

Figure 1:
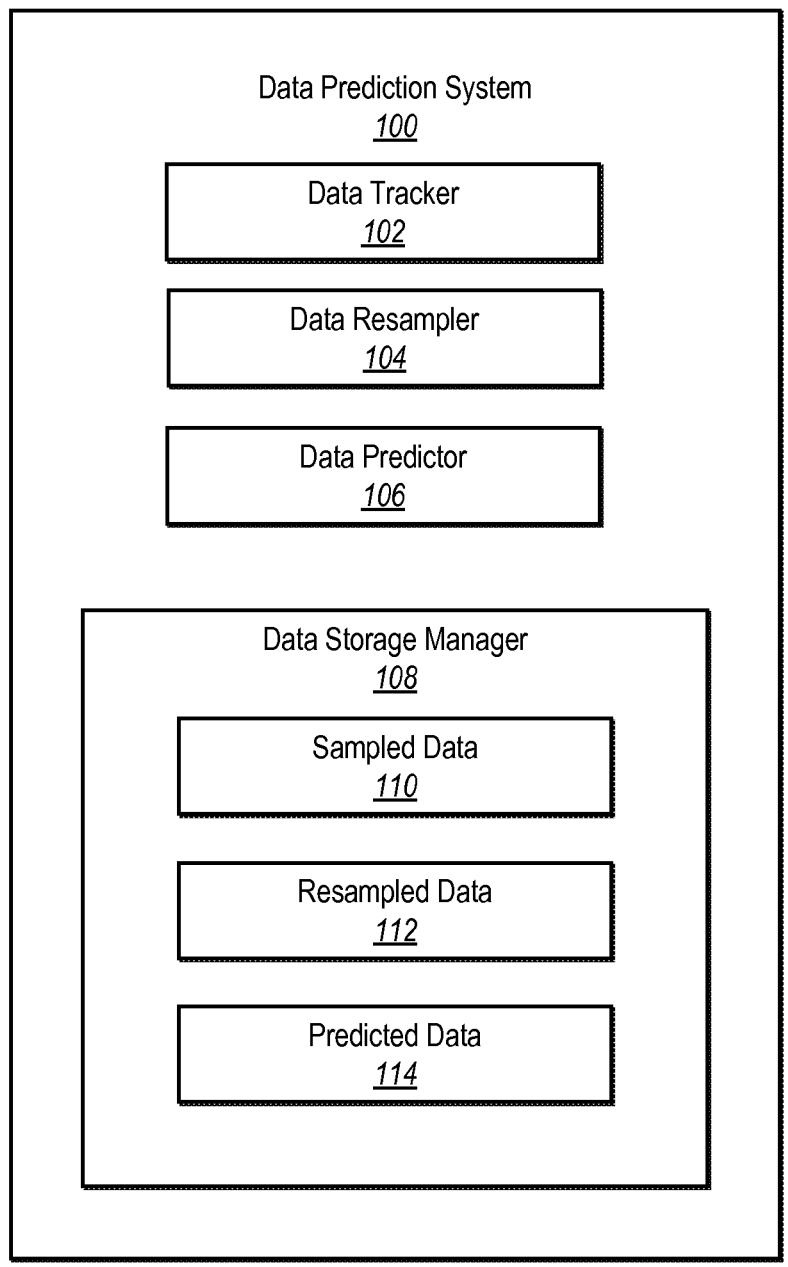
FIG. 1 illustrates a schematic diagram of one embodiment of a data prediction system in accordance with one or more embodiments.

One or more embodiments include a data prediction system that predicts future data points from a base dataset. In particular, the data prediction system can predict future data by randomly generating resampled data that at least partially maintains one or more time dependent characteristics of the base dataset. For example, the data prediction system can use a modified resampling process that maintains a time order of resampled data points. The data prediction system can then use the resampled data sets to predict a future dataset using a time series algorithm.

In particular, the data prediction system can predict data for a website based on collected analytics data corresponding to previous user interactions with the website. The data prediction system can maintain at least some time characteristics associated with the base dataset to provide informed predictions of future user visits and/or interactions corresponding to the website. One can appreciate that while the data prediction system can collect and predict user interactions with a website, the data prediction system can collect and predict any type of data for events associated with any type of medium.

In some embodiments, the data prediction system resamples sampled data points from a base dataset using a modified bootstrapping process. In particular, the modified bootstrapping process randomly resamples the base dataset with a time constraint to maintain the time order of the randomly resampled data. For example, each randomly resampled data point is selected from a group of data points that are chronologically after or at the same time as, but not before, the most recent resampled data point. Randomly resampling data points while maintaining a chronological order of the data points can provide data that more closely relates to the original data while also introducing a certain element of randomness into the data used for predicting future data.

In some implementations, the data prediction system can apply constraints for resampling one or more of the data points in the resampled datasets. In particular, the data prediction system can apply a constraint to guarantee that the final data point in the original dataset is not selected early in the resampling process for a particular resampled dataset. Constraining at least a portion of the resampled datasets to a particular subset of the original dataset can ensure that each of the resampled datasets has a certain amount of distinct data points.

Alternatively or additionally, the data prediction system can increase the total number (quantity) of resampled datasets. In particular, increasing the total number of resampled datasets increases the amount of randomness in the data used for predicting future data. Increasing the amount of randomness in the data used for predicting future data can help reduce the impact of resampled datasets with few distinct data points. For example, with a very large number of resampled datasets, the likelihood that a significant portion of the resampled datasets has a very small pool of distinct data points can be small.

Additionally, one or more embodiments of the data prediction system use a time series algorithm to predict future data based on the resampled data. In particular, the data prediction system can apply an autoregressive integrated moving-average (ARIMA) algorithm to the resampled data having at least some of the time characteristics of the originally sampled data to obtain predicted data. Applying the ARIMA algorithm to resampled data that maintains a chronological order of the originally sampled data from a bootstrapping process can produce informed predictions with improved accuracy.

In one or more embodiments, the data prediction system applies the ARIMA algorithm to each resampled dataset for each date or time associated with a particular future data point. In particular, the ARIMA algorithm determines a possible predicted data point for each time from each resampled data set. The data prediction system can then use the possible predicted data points for a particular time to determine the particular future data point based on an average or a mean of the possible predicted data points. Determining the future data points based on an average of the corresponding possible future data points can help reduce the effect of anomalies or outliers and can also help reduce variation in estimation of the future data points.

As used herein, the term "sampled data point" refers to data points in a base dataset. In particular, the base dataset can include sampled data points corresponding to actual or real data collected for an event. For example, the base dataset can include hits to a website, clicks on an advertisement in a webpage or application, downloads of a mobile application, user interactions with a particular element in an application, in-app purchase, or any other event corresponding to an application or other medium.

As used herein, the term "resampled data point" refers to a data point that is reproduced or resampled from the base dataset. In particular, a "resampled data point" can include data points that are resampled or reproduced to extend the base dataset for increasing the size of the data pool used in predicting future data points. For example, a resampled dataset can include randomly resampled data points from a base dataset including, but not limited to, data points representing hits to a website.

As used herein, the term "time dependent characteristic" refers to a characteristic of the base dataset and/or of the sampled data points in the base dataset that describes a time relationship of the sampled data points. In particular, the "time dependent characteristic" can describe at least one characteristic of time series data. For example, a "time dependent characteristic" can include, but is not limited to, a chronological order of the sampled data points, trend information for the sampled data points, seasonal characteristics of the sample data points, time relationships of groups of sampled data points, and other characteristics determined by or describing a time relationship of the sampled data points.

The methods and systems disclosed herein can provide improvements in predictive analysis by increasing the amount of data used to predict future data while taking advantage of the knowledge that the sampled data includes time series data points. In particular, maintaining the order of chronological data points when resampling the base dataset to create the resampled datasets can at least partially inform the selection randomly generated data. In some embodiments, particularly with regard to time series data, at least partially informed, random data can provide a better starting point for predicting future data than purely random data.

FIG. 1 illustrates a schematic diagram of one embodiment of a data prediction system. The data prediction system 100 may include, but is not limited to, a data tracker 102, a data resampler 104, a data predictor 106, and a data storage manager 108. Each of the components of the data prediction system 100 can be in communication with one another using any suitable communication technologies. It will be recognized that although the components of the data prediction system 100 are shown to be separate in FIG. 1, any of the components may be combined into fewer components, such as into a single component, or divided into more components as may sere a particular implementation.

The components can comprise software, hardware, or both. For example, the components can comprise one or more instructions stored on a computer-readable storage medium and executable by processors of one or more computing devices (e.g., client devices and/or server devices). When executed by the one or more processors, the computer-executable instructions of the data prediction system 100 can cause the computing device(s) to perform the document management methods described herein. Alternatively, the components can comprise hardware, such as a special purpose processing device to perform a certain function or group of functions. Additionally or alternatively, the components can comprise a combination of computer-executable instructions and hardware.

Furthermore, the components of the document management system 100 may, for example, be implemented as a stand-alone application, as a module of an application, as a plug-in for applications including image processing applications, as a library function or functions that may be called by other applications such as data prediction applications, and/or as a cloud-computing model. Thus, the components of the data prediction system 100 may be implemented as a stand-alone application, such as a desktop or mobile application. Alternatively or additionally, the components of the data prediction system 100 may be implemented in any application that allows users to predict data for any type of collected data, including but not limited to data collected for a third-party application. For example, the data prediction system 100 can be implemented in ADOBE SITECATALYST. "ADOBE" AND "SITECATALYST" are registered trademarks of Adobe Systems Incorporated in the United States and/or other countries.

As mentioned above, the data prediction system 100 can include a data tracker 102. In one or more embodiments, the data tracker 102 facilitates tracking data. For example, the data tracker 102 can track user interactions with an application. To illustrate, the data tracker 102 can track the number of visitors to a website by specific time periods (e.g., hits per hour, hits per day, hits per month). In some implementations, the data tracker 102 can track all user interactions with the software and cause the tracked data to be stored with the data storage manager 108.

The data prediction system 100 can also include a data resampler 104 to facilitate the generation of additional data for use in predicting future data. In particular, the data resampler 104 can generate a plurality of new, resampled datasets based on a base dataset. For example, the data resampler 104 can resample the sampled data points from the base dataset to create each resampled dataset. The data resampler 104 can generate any number of resampled datasets for producing accurate predictions of the future data.

Additionally, the data resampler 104 can at least partially maintain one or more time dependent characteristics of the sampled data points in the base dataset when generating the resampled datasets. More specifically, the data resampler 104 can maintain a time order of the previously sampled data points for each of the resampled datasets. For example, the data resampler 104 can resample data points from an original dataset according to a chronological order of the previously sampled data points in the original dataset to maintain the chronological order for the resampled data points in each of the resampled datasets.

In one or more embodiments, the data prediction system 100 also includes a data predictor 106, as mentioned above. The data predictor 106 can facilitate the prediction of data for an application based on actual data collected for the application. In particular, the data predictor 106 can predict future data describing user interactions with the application based on previous user interactions with the application. For example, the data predictor 106 can predict a number of hits to a website for a given time period based on the number of previous hits to the website over a particular time period.

As described above, the data prediction system 100 can include a data storage manager 108 to facilitate storage of information for the data prediction system 100. In particular, the data storage manager 108 can store information used by one or more of the components in the data prediction system 100 to facilitate the performance of various operations associated with data prediction. In one embodiment as shown in FIG. 1, the data storage manager 108 maintains sampled data 110, resampled data 112, and predicted data 114. The data storage manager 108 may also store any additional or alternative information corresponding to the operation of the data prediction system 100. The data storage manager 108 can maintain additional or alternative data as may serve a particular implementation. The data storage manager 108 may communicate with any component within the data prediction system 100 to obtain or share information for predicting data associated with the data prediction system 100. In one embodiment, the data storage manager 108 includes one or more servers on which various types of data are stored. For example, the data storage manager 108 may include or may be implemented in a data storage environment.

In some instances, the sampled data 110 can include sampled data points corresponding to a base dataset. In particular, the sampled data points can be part of a base dataset used to predict future data. For example, the sampled data points can include data representing actual or real data collected for a software application. To illustrate, the sampled data points can represent user interactions with a website or other application for specified periods of time. Alternatively, the sampled data points can represent other types of data associated such as purchases, application downloads, etc.

The sampled data 110 may be a small subset of data from a larger set of data representing collected data for the particular medium. Specifically, the sampled data 110 can include data points corresponding to one or more specified time periods from a set of data spanning a greater time period. For example, the sampled data 110 can include data points corresponding to one or more months of data from a set of data collected over several years. In alternative embodiments, the sampled data 110 can include all of the data available for the particular medium. For example, the particular medium may have a very limited amount of data collected over a small period of time.

According to one or more embodiments, the resampled data 112 can include data that has been resampled from the sampled data 110. In particular, the resampled data 112 can include resampled data points that were resampled from a base dataset. For example, the sampled data 110 in the base dataset can be resampled to create a plurality of resampled datasets to extend the pool of data available for predicting future data.

In one or more embodiments, the resampled data 112 retains at least some of the characteristics of the sampled data 110 in the base dataset. More specifically, if the sampled data 110 includes time series data, the resampled data 112 can retain at least some of the time dependent characteristics of the time series data. For instance, the data resampler 104 can resample the data from the base dataset in a chronological order, such that each resampled data point for a particular resampled dataset is chronologically after the most recent resampled data point.

Additionally, in some implementations, the data storage manager 108 can maintain predicted data 114 that includes data corresponding to future data for the particular medium. In particular, the predicted data 114 can include future data points corresponding to a future time period. For example, the predicted data 114 can represent estimations of data for one or more specified time periods that have not yet occurred, such as a specific number of days after a current time period. To illustrate, the predicted data 114 can represent estimations of hits to a website for a specified number of days in the future (e.g., the next 30 days).

Although the data storage manager 108 in FIG. 1 is described to include the sampled data 110, the resampled data 112, and the predicted data 114, the data storage manager 108 can include additional or alternative information related to the data prediction system 100, as previously mentioned. Additionally, the data storage manager 108 can include information for other types of systems and processes. For example, the data storage manager 108 can manage a distributed storage space configured to interface with one or more systems in addition to the data prediction system 100, allowing the different systems to interact with one another.

Figure 2:
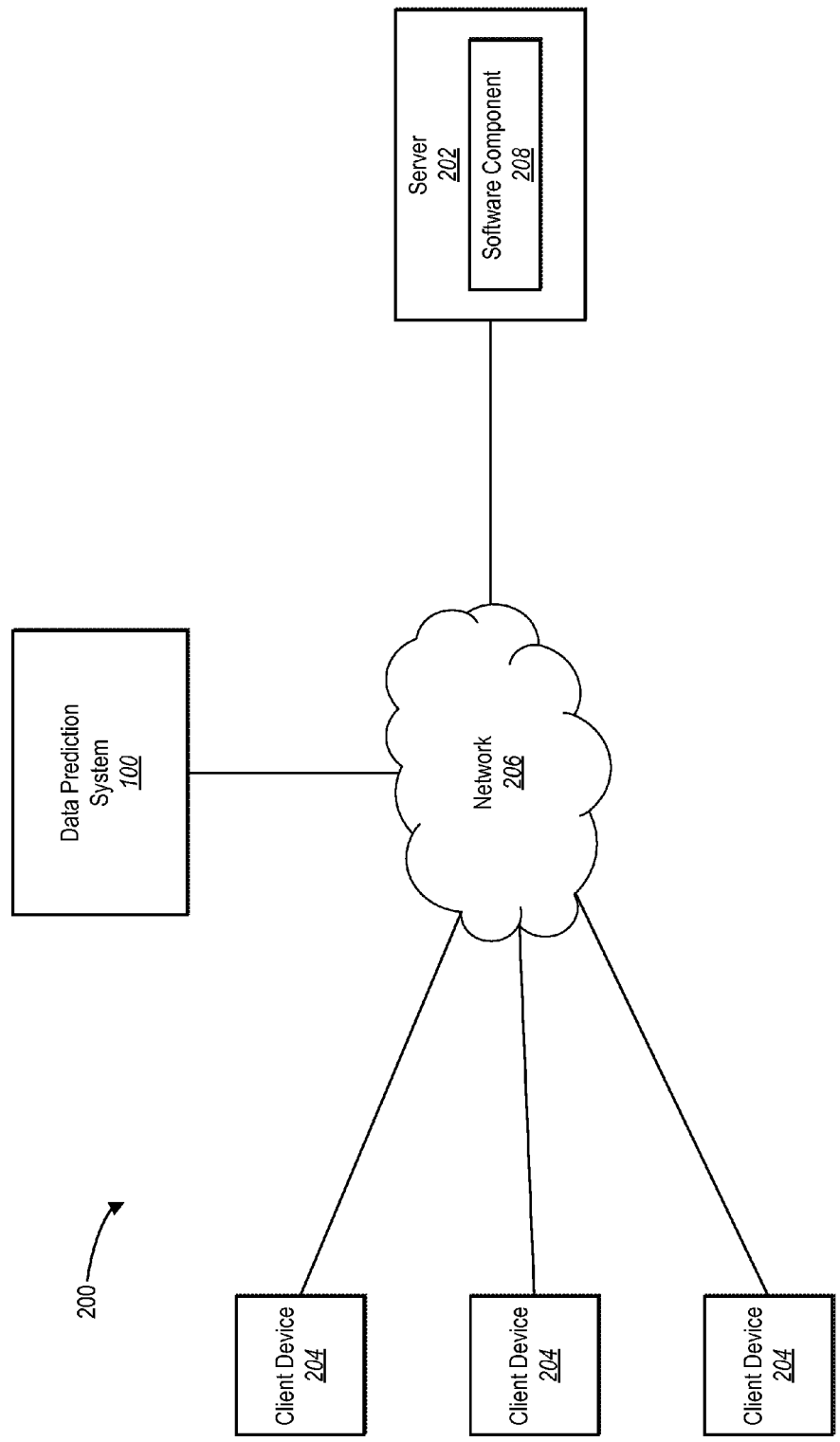
FIG. 2 illustrates a schematic diagram of one embodiment of a software media tracking system in accordance with one or more embodiments.

As previously mentioned, the data prediction system 100 can predict data for a software application. FIG. 2 illustrates a schematic diagram of one embodiment of the data prediction system 100 in a software media tracking system 200. In one embodiment, the software media tracking system 200 includes a server 202 connected to a data prediction system 100 and a plurality of client devices 204 via a network 206. Although the software media tracking system 200 of FIG. 2 is depicted as having various components, the software media tracking system 200 may have any number of additional or alternative components. For example, the software media tracking system 200 can be implemented on a single computing device with the data prediction system 100.

Although FIG. 2 depicts the data prediction system 100 in a software media tracking system 200, the data prediction system 100 can facilitate the prediction of future data for one or more media in one or more different systems. For example, the media can include an application running on the server 202. More specifically, the application can be a web hosting application stored at the server 202 and accessible by the client devices 204 via the network 206. Alternatively, the data prediction system 100 can perform one or more data prediction operations for other types or categories of media, including but not limited to web analytics, financial analytics, and/or other types of media.

In one or more embodiments, the server 202 can include a software component 208. In particular, the software component 208 can comprise an application running on the server 202 or a portion of a software application that can be downloaded from the server 202. For example, the software component 208 can include a web hosting application that allows the client devices 204 to interact with content hosted at the server 202. To illustrate, each of the client devices 204 can run separate instances of a web application (e.g., a web browser) to allow users to access, view, and/or interact with a website hosted at the server 202.

According to one or more embodiments, the software media tracking system 200 can include a data prediction system 100 in communication with the server 202. As previously described, the data prediction system 100 can be implemented on one or more devices. For example, the data prediction system 100 can include separate devices for performing one or more of the operations associated with data prediction. In one implementation, each of the devices can be in communication with the server 202 via the network 206. In an alternative implementation, at least some of the devices in the data prediction system 100 may not be in communication with the server 202 via the network 206, but may communicate with a specific device in the data prediction system 100 that is in communication with the server 202. In still further embodiments, the data prediction system 100 can be implemented on the server 202.

In one or more embodiments, the data prediction system 100 can predict future data for the software component 208. In particular, the data prediction system 100 can obtain data corresponding to the software component 208 from the server 202. To illustrate, the data prediction system 100 can obtain a base dataset corresponding to one or more months of data representing user interactions with the software component 208 (e.g., traffic to a website hosted at the server 202, application downloads from the server 202, content requests from the sever 202).

The server 202 may collect data for the base dataset during normal operation of the software component 208. For example, the server 202 can collect data for user interactions with the software component 208 and store the collected data in the base dataset to send to the data prediction system 100. In one embodiment, the base dataset sent to the data prediction system 100 includes one or more months of user interactions with the software component 208.

In alternative embodiments, the software media tracking system 200 can include a third party analytics system. In particular, the analytics system can be a third-party system that facilitates the collection of data and creation of the base dataset for one or more types of software media. In such instances, one or more servers 202 can establish one or more accounts with the data prediction system 100 and the analytics system. The account(s) may allow the data prediction system 100 to obtain the base dataset from the analytics system for a particular software component 208. In other embodiments, the data prediction system 100 can track the data for the software component 208.

The data prediction system 100 may use the data obtained from the server 202 to generate additional data for use in predicting the future data. Generating additional data can extend the base dataset to include a much larger pool of data for predicting the future data. As mentioned previously, increasing the size of the data pool can improve the accuracy of the predictions because a greater number of resampled datasets can limit the impact of outliers, anomalies, and datasets with a small number of unique data points. Thus, one way of improving the accuracy of a particular set of predicted future data is to further increase the number of resampled datasets.

In some embodiments, the data prediction system 100 can perform data prediction operations for more than one software component 208. Specifically, the data prediction system 100 can predict data for one or more types of software systems. For example, the data prediction system 100 can include a third-party system that can predict future data for a plurality of different systems. To illustrate, the data prediction system 100 can obtain base datasets for each of the plurality of different software systems by way of a third-party analytics system, as described above, from each of the servers 202 hosting the software components, or in any manner according to the implementation of a particular software component 208. Alternatively, the data prediction system 100 can predict future data for a single software component 208.

Figure 3:
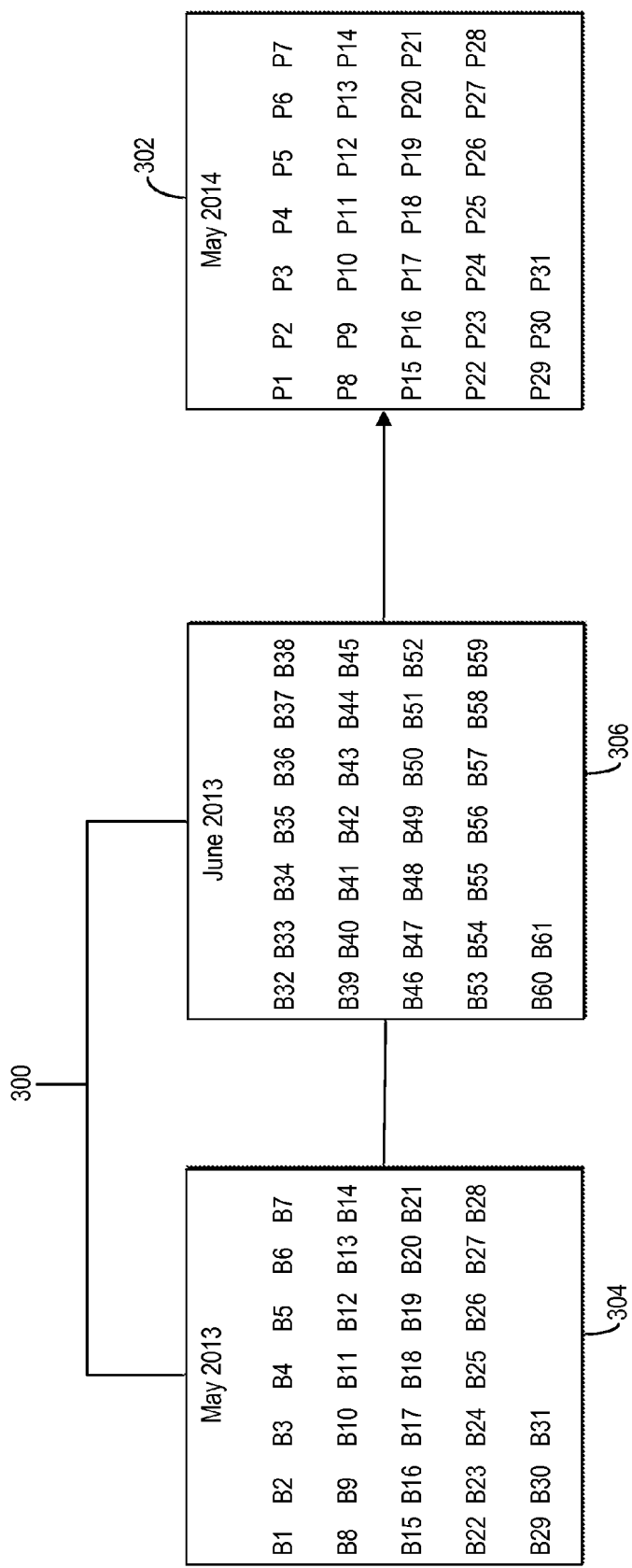
FIG. 3 illustrates a block diagram of a base dataset and a predicted future dataset in accordance with one or more embodiments.

As described above, the data prediction system 100 can predict future data using a based dataset. FIG. 3 illustrates a block diagram of a base dataset 300 and a predicted future dataset 302 according to one or more embodiments. The base dataset 300 include base data points B1-B61 representing a particular type of data. The predicted future dataset 302 can include a plurality of predicted data points P1-P30 representing the particular type of data calculated from the base data points B1-B61. Additionally, the base dataset 300 and the predicted future dataset 302 can each include any number of data points as may serve a particular embodiment.

According to one or more embodiments, the base dataset 300 can include a set of data points collected by the data prediction system 100 or a system in communication with the data prediction system 100, as described above. In particular, the base dataset 300 can include any type of data associated with a particular system that allows the data prediction system 100 to predict one or more future data points based on the base dataset 300. For example, as shown in FIG. 3, the base dataset 300 can include data points B1-B61 representing hits to a website. Specifically, the data points B1-B61 can represent the number of hits to a website for each day within a specific period of time (e.g., month).

Additionally, one or more embodiments of the predicted future dataset 302 can include a set of data points P1-P30 predicted based on the data points B1-B61 in the base dataset 300. For example, the predicted future dataset 302 can include a set of predicted future data points P1-P30 representing future hits to the website during a specified future period of time. To illustrate, the predicted future dataset 302 can include a set of data points P1-P30 representing each day over the next month or the next 30 days. In other examples, the future dataset 302 can include any number of data points as may serve a particular embodiment.

In a particular implementation, the base dataset 300 includes a set of data points used for determining a future set of data points representing hits to the website. In particular, the base dataset 300 can include data points representing real data collected for the website for one or more previous periods of time. For instance, the base dataset 300 can include a first month 304 of data points representing hits to the website during the month or time period one year prior to the predicted period of time. The base dataset 300 can also include a second month 306 of data points representing hits to the website during the month or period of time before the present time. Thus, the base dataset 300 in one example can include approximately 60 data points for about two months of data representing hits to the website.

As shown in FIG. 3, the base dataset 300 and the predicted future dataset 302 may have different numbers of data points. Specifically, the base dataset 300 can include a number of data points to produce a certain number of predicted future data points with a specified level of certainty regarding the accuracy of the predicted future data points. For example, the base dataset 300 may be required to have a certain number of data points to be able to accurately predict a specified number of future data points (e.g., 60 data points in the base dataset 300 to produce 30 data points in the predicted future dataset 302).

Figure 4:
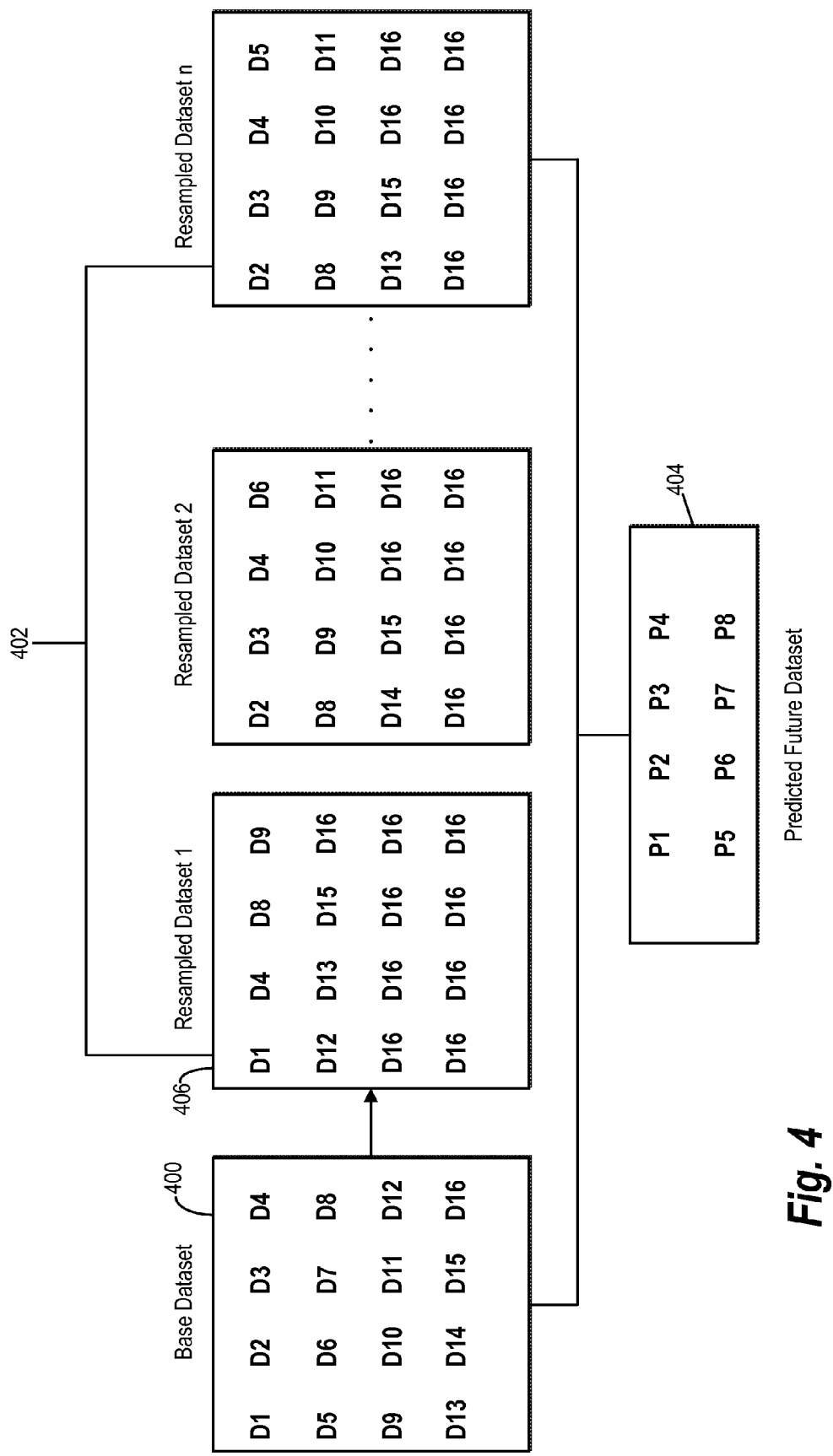
FIG. 4 illustrates a block diagram of a base dataset and a plurality of resampled datasets in accordance with one or more embodiments.

FIG. 4 illustrates a block diagram of a base dataset 400 and a plurality of resampled datasets 402. Although the base dataset 400 and the resampled datasets 402 shown in FIG. 4 each have a certain number of data points D1-D16, the base dataset 400 and the resampled datasets 402 may have any number of data points as may serve a particular implementation. Additionally, while the base dataset 400 and each of the resampled datasets 402 in FIG. 4 have the same number of data points, the resampled datasets 402 may have a different number of data points than the base dataset 400.

In one or more embodiments, the base dataset 400 includes sampled data points D1-D16 representing actual or real data associated with a particular system. Specifically, the sampled data points can include data points associated with real data collected for one or more specific periods of time. In some implementations, the data points in the base dataset 400 may be chronologically consecutive data points. In other implementations, at least some of the data points in the base dataset 400 may not be consecutive data points, such that the data points may be taken from one or more different periods of time.

According to one or more embodiments, the data prediction system 100 can use the base dataset 400 to generate a plurality of resampled datasets 402 to extend the available pool of data by resampling actual data from the base dataset 400. The base dataset 400 can include one or more time dependent characteristics associated with and/or describing the data points. For example, the base dataset 400 can store the data points according to a chronological order of the data points. To illustrate, the base dataset 400 can store data points corresponding to two months of data representing hits to a website in an order of the corresponding dates. Additionally or alternatively, the base dataset 400 can include other time dependent characteristics of the data points, individually and/or collectively.

In some embodiments, the data prediction system 100 can use the base dataset 400 to generate a plurality of resampled datasets 402, as mentioned. In particular, the data prediction system 100 can generate a specified number of resampled datasets 402 by resampling data points D1-D16 from the base dataset 400 until each of the resampled dataset has a specified number of data points. The data prediction system 100 can include any number of resampled datasets 402. As described previously, generating a large number of resampled datasets 402 to increase the data pool used for predicting future data can decrease the impact of anomalies in the resampled datasets 402. In some implementations, the number of resampled datasets 402 may be determined based on criteria including, but not limited to, the size of the base dataset 400, the size of the resampled datasets 402, a confidence level associated with the accuracy of the predicted future data, the type of data, and/or other criteria.

One or more embodiments of the data prediction system 100 use a resampling algorithm to randomly generate the resampled data points in the resampled datasets 402 to increase the pool of data while maintaining at least one time dependent characteristic of the base dataset 400. In particular, the data prediction system 100 can include a modified bootstrapping algorithm to introduce randomness into the resampled datasets 402 while maintaining one or more time dependent characteristics of the base dataset 400. For example, the modified bootstrapping algorithm can generate the resampled datasets 402 to include resampled data points from the base dataset 400 in chronological order.

As an illustrative embodiment of the modified bootstrapping algorithm, the data prediction system 100 can generate a first resampled dataset 406, as shown in FIG. 4, having sixteen resampled data points from a base dataset 400 having sixteen sampled data points. The first resampled dataset 406 includes a first resampled data point D1 resampled from the first sampled data point D1 from the base dataset 400. Because the data prediction system 100 resampled the first sampled data point D1 from the base dataset 400, the data prediction system 100 can then randomly resample the second data point for the resampled dataset 1 randomly from a set consisting of the first sampled data point D1 to the sixteenth sampled data point D16 in the base dataset 400. Similarly, the data prediction system 100 randomly resamples the fourth sampled data point D4 as the second resampled data point, such that the data prediction system 100 can then randomly resample the third resampled data point from the set consisting of the fourth sampled data point to the sixteenth sampled data point in the base dataset 400. The data prediction system 100 can fill out each of the resampled datasets 402 in such a manner while maintaining the chronological order as stored in the base dataset 400.

Additionally or alternatively, the modified bootstrapping algorithm can maintain trend information associated with the data points in the base dataset 400 when generating the resampled datasets 402. Specifically, the algorithm can maintain a trend associated with a specific group of data points from the base dataset 400 to the resampled datasets 402. To illustrate, the algorithm can detect an upward or a downward trend in a group of data points in the base dataset 400. When generating the resampled datasets 402, the algorithm can randomly resample data points within the group of data points while maintaining the detected trend in the resampled data points in the resampled datasets 402.

In some embodiments, the modified bootstrapping algorithm can maintain a time characteristic associated with one or more groups of sampled data points from the base dataset 400. Specifically, the algorithm can apply a constraint to groups of resampled data points in the resampled datasets 402, such that the algorithm only resamples certain data points within a specific range of sampled data points from the base dataset 400. For instance, the algorithm can apply a constraint to a first group of resampled data points by only resampling the first group of resampled data points in one or more resampled datasets 402 from a first group of sampled data points of the base dataset 400. To illustrate, the first eight resampled data points of a resampled dataset including sixteen resampled data points may only be randomly resampled from the first twelve sampled data points of a base dataset 400 having sixteen sampled data points. Such constraints may ensure that the first group of resampled data points does not include the last sampled data point from the base dataset 400.

In one or more embodiments, applying constraints to groups of sampled data points form the base dataset 400 when generating the resampled datasets 402 can maintain the chronological order from the base dataset 400. For example, the algorithm can apply one or more constraints while randomly sampling within the constraints in a chronological order. Thus, each of the resampled datasets 402 can include resampled data points that are randomly sampled from the base dataset 400 while also being in the order in which the sampled data points are stored in the base dataset 400.

Alternatively, the algorithm can apply constraints to the resampled data points for chronological groups of sampled data points to maintain a time dependent characteristic without every resampled data point necessarily being in chronological order. To illustrate, the algorithm can generate a first group of resampled data points completely randomly from a first group of sampled data points in the base dataset 400, and a second group of resampled data points completely randomly from a second group of sampled data points in the base dataset 400. At least some of the data points in the second group of sampled data points are ordered chronologically after the last sampled data point in the first group of sampled data points.

In some embodiments, the modified bootstrapping algorithm can resample the final sampled data point in the base dataset 400 a plurality of times in one or more of the resampled datasets 402. More specifically, for embodiments in which the resampled datasets 402 maintain a chronological order of the sampled data points in the base dataset 400, the final sampled data point in the base dataset 400 may be resampled for a particular resampled dataset prior to completing the particular resampled dataset. For example, the final sampled data point may be resampled a plurality of times until the particular resampled dataset is completed in order to make sure that the resampled dataset does not include any resampled data points that are not in chronological order.

As previously mentioned, the data prediction system 100 can predict a future dataset based on the base dataset 400 and the resampled datasets 402. In one or more embodiments, the data prediction system 100 can use the sampled data points in the base dataset 400 in combination with the resampled data points in the resampled datasets 402 to generate one or more predicted future data points in a predicted future dataset 404. In some alternative embodiments, the data prediction system 100 may use only the resampled datasets 402 to generate the predicted future dataset 404.

The predicted future dataset 404 can have any number of predicted future data points as may serve a particular embodiment. Specifically, the data prediction system 100 can determine the size of the predicted future dataset 404 at least partially based on the size of the base dataset 400 and/or the size of the resampled datasets 402. For example, the data prediction system 100 can determine that the size of the predicted future dataset 404 is half the size of the base dataset 400. In other examples, the data prediction system 100 can determine the size of the predicted future dataset 404 to be any fraction or multiple of the size of the base dataset 400 and/or resampled datasets 402.

Additionally or alternatively, the data prediction system 100 can determine the size of the resampled dataset based on the accuracy or a confidence of the accuracy of the predicted future data points. As the size of the predicted future dataset 404 increases, the accuracy of predicted future data points, especially those further away from a current time, can decrease. Thus, limiting the size of the predicted future dataset 404 to a specified quantity of predicted future data points can improve the accuracy of the predicted data.

According to one or more embodiments, the data prediction system 100 can apply an algorithm to the pool of data (e.g., the base dataset 400 and the resampled datasets 402) to obtain the predicted future dataset 404. In particular, the algorithm for generating the predicted future dataset 404 can be a time series algorithm. For example, the algorithm can be an autoregressive integrated moving-average (ARIMA) algorithm. In other implementations, the algorithm can be a different type of time series algorithm for predicting future data points, including, but not limited to an only an autoregressive algorithm or only a moving average algorithm.

In some implementations, the data prediction system 100 applies the ARIMA algorithm to each of the resampled datasets 402 to obtain possible future data points for determining the predicted future data points in the predicted future dataset 404. Specifically, the ARIMA algorithm can determine a possible future data point for a particular future time associated with the predicted future dataset 404. In one example, the ARIMA algorithm can determine a possible future data point for each of the resampled datasets 402 and for each particular future time. To illustrate, the data prediction system 100 can apply the ARIMA algorithm to the plurality of resampled datasets 402 to obtain a possible future data point from each of the resampled datasets 402 for a particular future time.

After generating a plurality of possible future data points for each of the resampled datasets 402 for each particular future time, the data prediction system 100 can determine the predicted future data points based on the corresponding possible future data points. In one or more embodiments, the data prediction system 100 can determine a predicted future data point for a particular time by averaging or determining a mean of the possible future data points corresponding to the particular time. Thus, providing a large number of resampled datasets 402 can minimize the influence that resampled datasets 402 with few unique resampled data points can have on the resulting predicted future data point. In alternative embodiments, the data prediction system 100 can determine the predicted future data points from the resampled datasets 402 using any algorithm or method.

In one or more embodiments, the data prediction system 100 can generate a predicted future dataset 404 having a number of predicted future data points based on the number of data points in the base dataset 400 and/or the resampled datasets 402. According to one example, the predicted future dataset 404 can include fewer predicted future data points than sampled data points in the base dataset 400 and/or than resampled data points in the resampled datasets 402. In alternative embodiments, the predicted future dataset 404 can include any number of predicted future data points.

As described above, the data prediction system 100 can use an ARIMA algorithm to determine the predicted future dataset 404. In some embodiments, the data prediction system 100 can optimize the ARIMA algorithm using a training dataset. Training the ARIMA algorithm using a training dataset can allow the data prediction system 100 to apply different weights to the resampled data points when determining the predicted future dataset 404 or to adjust other aspects of the ARIMA algorithm.

In one or more embodiments, the training dataset can include resampled datasets 402. In particular, the training dataset can include a specified number of resampled datasets 402 generated based on the base dataset 400. The amount of data included in the training dataset can be determined based on how accurate the ARIMA algorithm is in generating a predicted future dataset 404 that follows the base dataset 400. In various implementations, applying the ARIMA algorithm to the training dataset allows the data prediction system 100 to set one or more variables of the ARIMA algorithm to achieve the best results.

In additional embodiments, the data prediction system 100 can also apply a jackknife-resampling algorithm to a second training dataset for improving the predicted future dataset 404. In particular, the data prediction system 100 can apply the jackknife algorithm to a second training dataset to adjust one or more of the variables of the ARIMA algorithm for further improving the accuracy of the predicted future dataset 404. For example, applying the jackknife algorithm to the second training dataset can allow the data prediction system 100 to adjust variables in the ARIMA algorithm and/or otherwise improve the ARIMA algorithm for predicting the future data points. To illustrate, the jackknife-resampling algorithm can determine that one or more of an autoregressive component, a moving-average component, or other variable of the ARIMA requires adjustment. Alternatively, the data prediction system 100 can apply one or more other testing methods for improving the prediction model.

In one or more embodiments, the data prediction system 100 can select the size or number of the resampled datasets 402 to more accurately predict future data points. For example, the data prediction system 100 can determine the number of resampled datasets 402 to minimize or reduce a mean squared error (MSE) of the predicted future dataset 404. In other embodiments, the data prediction system 100 can determine the number of resampled datasets 402 to optimize other aspects of the jackknife algorithm, the ARIMA algorithm, the resampling process, or the data prediction process as a whole. For example, the data prediction system 100 can also select variables in the ARIMA algorithm and/or jackknife algorithm to further optimize the data prediction process and minimize or reduce the MSE of the predicted future dataset 404. In one example, the size of each resampled dataset can be the same as the size of the base dataset 400.

According to one or more embodiments, the data prediction system 100 can predict future data for stationary data. In particular, the base dataset 400 can include data that has parameters such as mean and variance that do not change over time and may not have trend information associated with the data. In some implementations, the data in the base dataset 400 may not originally be stationary data, but may be transformed into stationary data. An ARIMA algorithm can transform the non-stationary data into stationary data. The data prediction system 100 can apply the modified bootstrapping process and the trained ARIMA algorithm to the data to generate the predicted future dataset 404.

Figure 5:
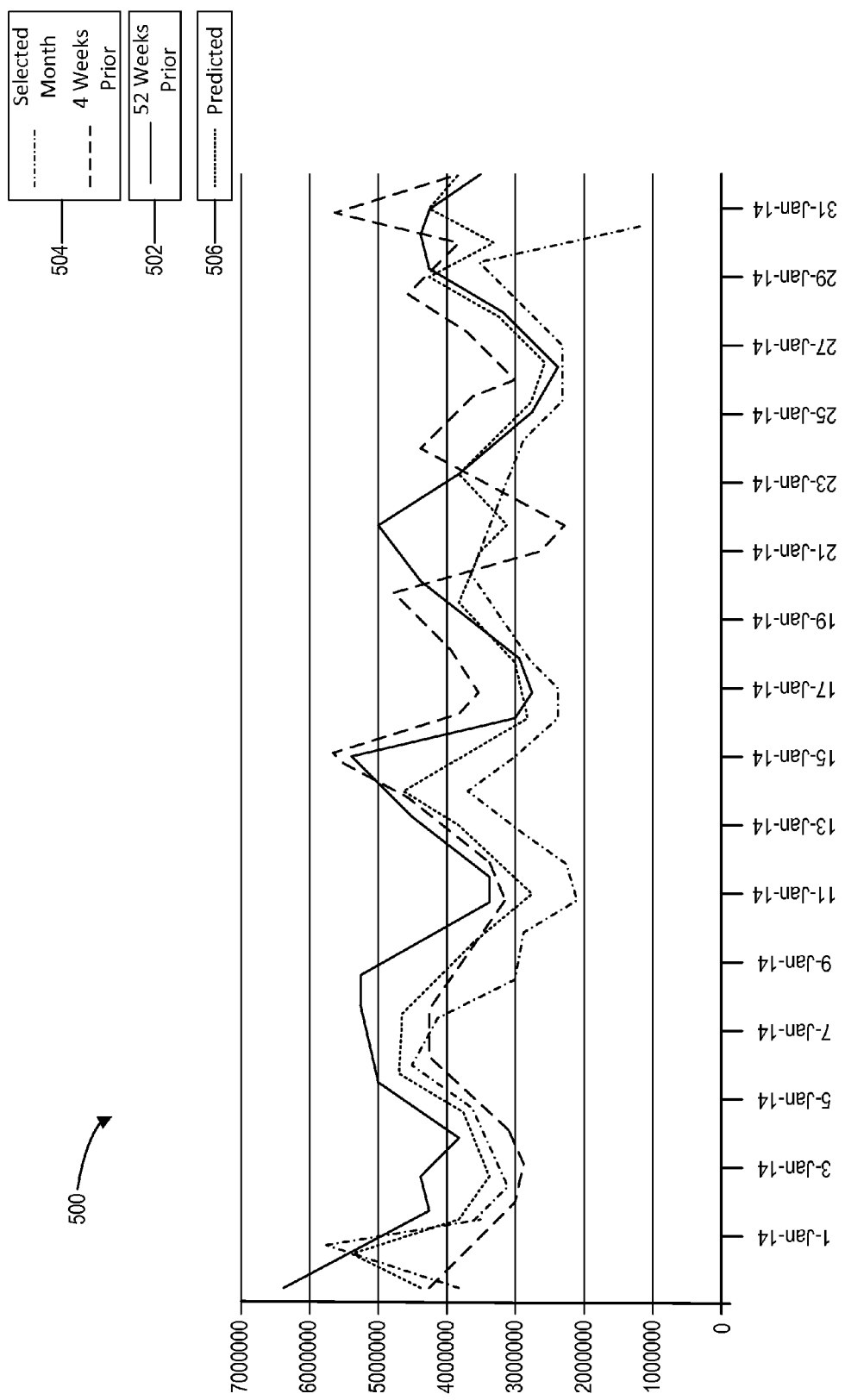
FIG. 5 illustrates a graph diagram of sampled and predicted user traffic for a webpage in accordance with one or more embodiments.

As mentioned, the base dataset can include data representing user interactions with a website or other type of application. FIG. 5 illustrates a graph diagram 500 of sampled user traffic and predicted user traffic for a webpage for a selected month 504. Although the graph diagram illustrates data representing a certain number of hits to a website for a specific period of time, the data may be any type of data for any amount of time.

In one or more embodiments, the base dataset 502 can include two months of data representing hits to a particular website. In particular, the base dataset 502 can include data collected for the month prior to the current month and data collected for the current month of the previous year. In other examples, the base dataset 502 can include any time periods of data representing hits to the website and/or any number of time periods of data as may serve the particular implementation (e.g., to minimize the MSE of the predicted future dataset).

As shown in FIG. 5, the data prediction system 100 can generate a predicted future dataset using the base dataset 502 and a plurality of resampled datasets based on the base dataset 502. In particular, the predicted future dataset 506 can include data points corresponding to a particular future time. For example, the predicted future dataset 506 can include predicted data points representing estimates of the number of hits to the website for the upcoming month (selected month 504). Although the predicted future dataset 506 is shown in FIG. 5 to include the predicted data points for a future month, the predicted future dataset 506 can include predicted data points for any future time period of any size.

The graph diagram of FIG. 5 also shows a real dataset corresponding to the selected month 504. Specifically, the real dataset includes real data points representing purchases on the website during the selected month 504 corresponding to the predicted future time to compare the predicted future dataset 506 to the real dataset. The real dataset can alternatively include real data points representing hits to the website, application downloads, and/or any other type of data collection, as may serve a particular implementation. As illustrated, the predicted future dataset 506 is similar to the real dataset and has many of the same trends (hills and valleys) in the user traffic for the website that the real dataset exhibits. In one instance, the data prediction system 100 can compare the real dataset to the predicted future dataset 506 while training the time series algorithm to improve performance of the time series algorithm. For example, the data prediction system 100 can determine that the real dataset is more similar to a specified portion of the base dataset and adjust the time series algorithm to modify the weights given to the data points in the base dataset.

FIGS. 1-5, the corresponding text, and the examples, provide a number of different systems and devices for predictive analytics. In addition to the foregoing, one or more also can be described in terms of flowcharts comprising acts and steps in a method for accomplishing a particular result. For example, FIGS. 6 and 7 illustrate flowcharts of exemplary methods in accordance with one or more embodiments.

Figure 6:
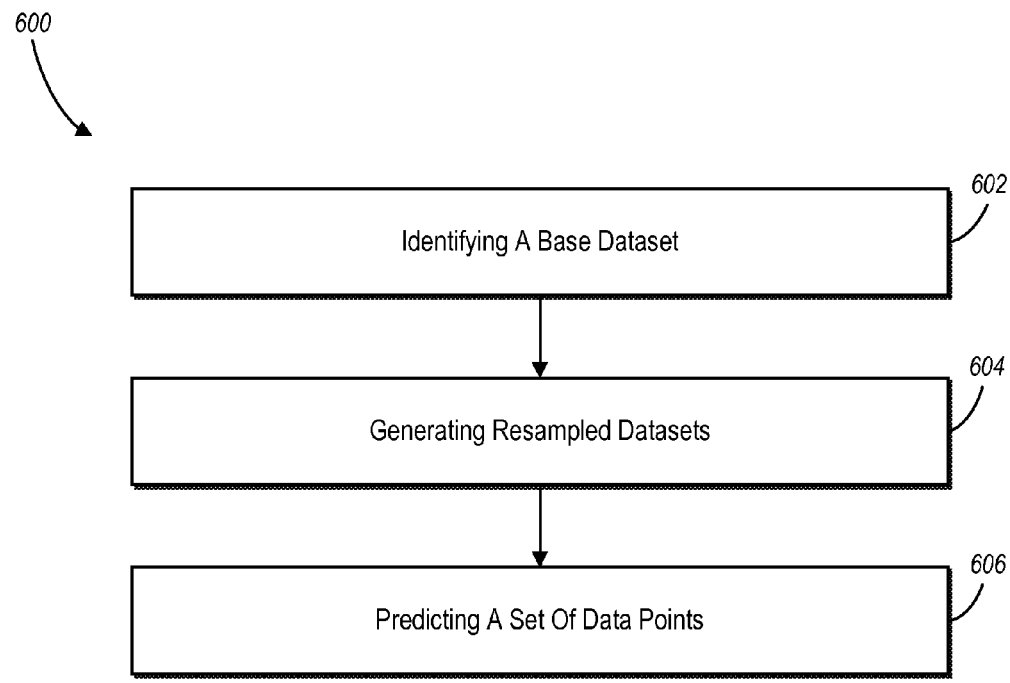
FIG. 6 illustrates a flowchart of a series of acts in a method of predictive analytics in accordance with one or more embodiments.
Figure 7:
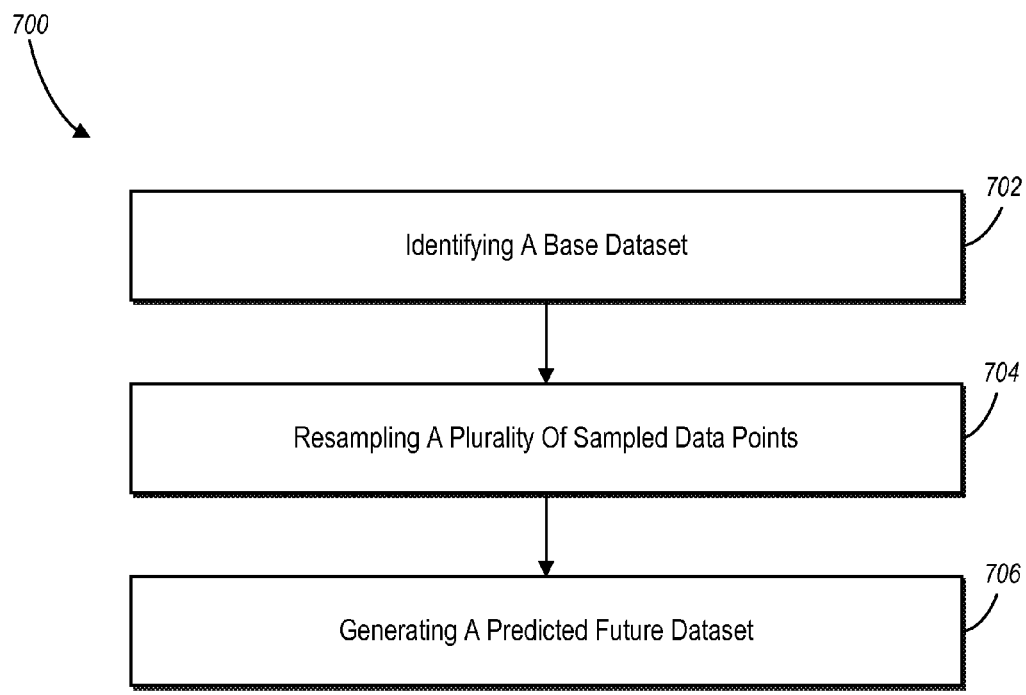
FIG. 7 illustrates a flowchart of a series of acts in a method of predicting a future dataset in accordance with one or more embodiments.

FIG. 6 illustrates a flowchart of a series of acts in a method of predictive analytics. The method 600 includes an act 602 of identifying a base dataset 300, 400, 502. Specifically, act 602 can involve identifying a base dataset 300, 400, 502 comprising a plurality of sampled data points describing a set of events, wherein the plurality of sampled data points comprise at least one time dependent characteristic in the base dataset 300, 400, 502. For example, the time dependent characteristic can include a chronological order of the plurality of sampled data points in the base dataset 300, 400, 502.

Additionally, the plurality of sampled data points can correspond to hits to a website for at least one specified time period. To illustrate, the plurality of sampled data points can correspond to a first month immediately prior to a predicted future month and a second month one year prior to the predicted future month.

The method 600 also includes an act 604 of generating resampled datasets 402. In particular, act 604 involves generating a plurality of resampled datasets 402, each of the plurality of resampled datasets 402 being generated by randomly resampling the plurality of sampled data points while maintaining the at least one time dependent characteristic of the plurality of sampled data points to obtain a plurality of resampled data points. For instance, act 604 can involve randomly resampling a first subset of the base dataset 300, 400, 502 to obtain a first group of resampled data points and a second subset of the base dataset 300, 400, 502 to obtain a second group of resampled data points, wherein at least some of the plurality of sampled data points in the second subset are chronologically ordered after a final data point in the first subset. In one or more embodiments, the method 600 can apply a modified bootstrapping algorithm to the base dataset 300, 400, 502 to obtain the resampled datasets 402.

Additionally, the method 600 includes an act 606 of predicting a set of data points. Specifically, act 606 involves predicting, by at least one processor, a set of data points corresponding to future events by applying a time series algorithm to the plurality of resampled datasets 402. For example, act 606 can involve applying different weights to at least some of the plurality of resampled data points in the plurality of resampled datasets 402.

Act 606 can also involve generating, for a particular future time, a plurality of possible future data points. Each of the possible future data points can be based on a different resampled dataset. Additionally, act 606 can involve averaging the possible future data points to obtain an estimated data point corresponding to the particular future time.

As an additional act, or as part of act 606, the method 600 can include applying a jackknife-resampling algorithm to a training dataset. The jackknife-resampling algorithm can adjust a mean-squared error for the predicted set of data points by setting or adjusting a plurality of variables of the time series algorithm based on a result of the jackknife-resampling algorithm. In some instances, the time series algorithm can be an autoregressive integrated moving-average algorithm.

FIG. 7 illustrates a flowchart of a series of acts in a method 700 of predicting a future dataset. The method 700 includes an act 702 of identifying a base dataset 300, 400, 502. Specifically, act 702 involves identifying a base dataset 300, 400, 502 comprising a plurality of sampled data points organized in a chronological order.

The method 700 also includes an act 704 of resampling a plurality of sampled data points. In particular, act 704 involves randomly resampling, for each of a plurality of resampled datasets 402, the plurality of sampled data points while maintaining the chronological order of the plurality of sampled data points to obtain a plurality of resampled data points. For example, act 704 can involve randomly resampling a first subset of the base dataset 300, 400, 502 to obtain a first group of resampled data points for a particular resampled dataset. Act 704 can also involve randomly resampling a second subset of the base dataset 300, 400, 502 to obtain a second group of resampled data points for the particular resampled dataset. At least a portion of the second subset is chronologically ordered after the first dataset.

As an additional act, or as part of act 704, the method 700 can include determining a quantity of resampled datasets 402 for use in generating the predicted future dataset 302, 404, 506 based on a quantity of sampled data points in the base dataset 300, 400, 502. The quantity of resampled datasets 402 can additionally or alternatively be based on other criteria.

Additionally, the method 700 includes an act 706 of generating a predicted future dataset 302, 404, 506. More specifically, act 706 involves generating, by at least one processor, a predicted future dataset 302, 404, 506 by applying a time series algorithm to the plurality of resampled datasets 402. For example, act 706 can include applying different weights to the plurality of resampled data points based on a chronological position of the resampled data points.

Additionally, act 706 can involve generating a plurality of possible future data points for a particular future time. Each of the possible future data points can be based on a different one of the plurality of resampled datasets 402. Act 706 can also involve determining a mean of the plurality of possible future data points to obtain a predicted future data point corresponding to the particular future time.

As an additional act, or as part of act 706, the method 700 can include applying a jackknife-resampling algorithm to a training dataset. The method 700 can use the jackknife-resampling algorithm to adjust a mean-squared error for the predicted set of data points by setting a plurality of variables of the time series algorithm based on a result of the jackknife-resampling algorithm. In some instances, the time series algorithm can be an autoregressive integrated moving-average algorithm.

One or more embodiments may comprise or utilize a special purpose or general-purpose computer including computer hardware, such as, for example, one or more processors and system memory, as discussed in greater detail below. One or more embodiments also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, One or more embodiments can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing the methods described herein. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that one or more embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. One or more embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

One or more embodiments can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
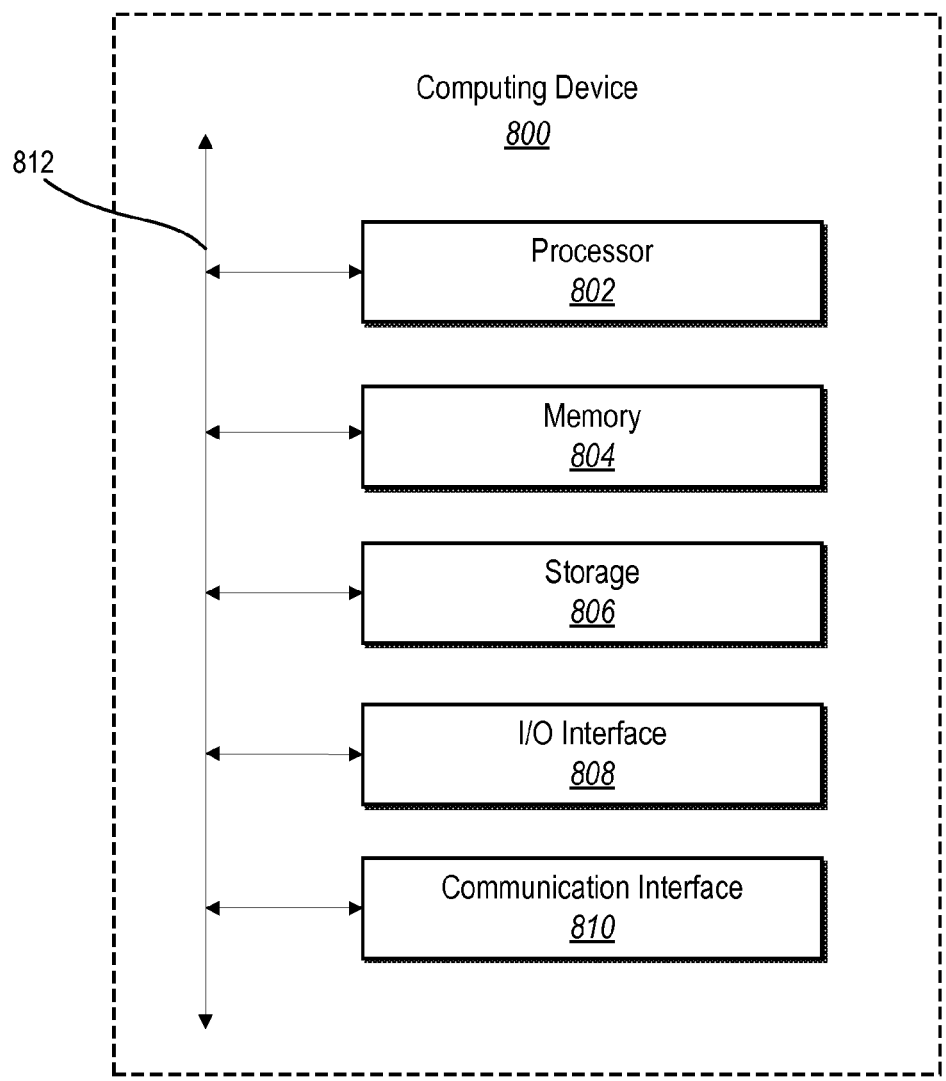
FIG. 8 illustrates a block diagram of an exemplary computing device in accordance with one or more embodiments.

FIG. 8 illustrates a block diagram of an exemplary computing device that may be configured to perform one or more of the processes described above. One will appreciate that the data prediction system 100 can comprise implementations of the computing device 800. As shown by FIG. 8, the computing device can comprise a processor 802, memory 804, a storage device 806, an I/O interface 808, and a communication interface 810. While an exemplary computing device 800 is shown in FIG. 8, the components illustrated in FIG. 8 are not intended to be limiting. Additional or alternative components may be used in other embodiments. Furthermore, in certain embodiments, a computing device 800 can include fewer components than those shown in FIG. 8. Components of computing device 800 shown in FIG. 8 will now be described in additional detail.

In particular embodiments, processor(s) 802 includes hardware for executing instructions, such as those making up a computer program. As an example and not by way of limitation, to execute instructions, processor(s) 802 may retrieve (or fetch) the instructions from an internal register, an internal cache, memory 804, or a storage device 806 and decode and execute them. In particular embodiments, processor(s) 802 may include one or more internal caches for data, instructions, or addresses. As an example and not by way of limitation, processor(s) 802 may include one or more instruction caches, one or more data caches, and one or more translation lookaside buffers (TLBs). Instructions in the instruction caches may be copies of instructions in memory 804 or storage 806.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 includes a storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In particular embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 800 also includes one or more input or output ("I/O") devices/interfaces 808, which are provided to allow a user to provide input to (such as user strokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a stylus or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 810. As an example and not by way of limitation, computing device 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 800 may include any suitable communication interface 810 for any of these networks, where appropriate.

The computing device 800 can further include a bus 812. The bus 812 can comprise hardware, software, or both that couples components of computing device 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, various embodiments and aspects are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method of predictive analytics, comprising:
identifying, by at least one processor, a base dataset comprising a plurality of sampled data points describing a set of events, wherein the plurality of sampled data points in the base dataset comprise a chronological order;
randomly resampling, by the at least one processor, the plurality of sampled data points to obtain a plurality of resampled data points, wherein randomly resampling the plurality of sampled data points comprises randomly resampling a first sampled data point and, for each subsequent resampled data point from the plurality of resampled data points, randomly resampling a data point from a subset of the plurality of sampled data points that is chronologically at the same time as, or after, a most recent resampled data point preceding the resampled data point;
generating, by the at least one processor, a plurality of resampled datasets comprising the plurality of randomly resampled data points while maintaining the chronological order of the plurality of sampled data points; and
predicting, by the at least one processor, a set of data points corresponding to future events by applying a time series algorithm to the plurality of resampled datasets.

2. The method as recited in claim 1, wherein the plurality of sampled data points corresponds to hits to a website for at least one specified time period.

3. The method as recited in claim 2, wherein the plurality of sampled data points corresponds to a first month immediately prior to a predicted future month and a second month one year prior to the predicted future month.

4. The method as recited in claim 1, wherein generating the plurality of resampled datasets further comprises:
randomly resampling a first subset of the plurality of sampled data points in the base dataset to obtain a first group of resampled data points for a particular resampled dataset; and
randomly resampling a second subset of the plurality of sampled data points in the base dataset to obtain a second group of resampled data points for the particular resampled dataset, wherein at least some of the plurality of sampled data points in the second subset of the base dataset are chronologically ordered after a final data point in the first subset of the base dataset.

5. The method as recited in claim 1, wherein predicting the set of data points corresponding to future events further comprises applying different weights to at least some of the plurality of resampled data points in the plurality of resampled datasets.

6. The method as recited in claim 1, wherein predicting the set of data points corresponding to future events further comprises:
generating, for a particular future time, a plurality of possible future data points, wherein generating the plurality of possible future data points comprises generating each of the plurality of possible future data points using a different one of the plurality of resampled datasets; and
averaging the plurality of possible future data points to obtain an estimated future data point corresponding to the particular future time.

7. The method as recited in claim 1, further comprising:
applying a jackknife-resampling algorithm to a training dataset; and
adjusting a mean-squared error for the predicted set of data points by setting a plurality of variables of the time series algorithm based on a result of the jackknife-resampling algorithm.

8. The method as recited in claim 1, wherein randomly resampling the plurality of sampled data points to obtain the plurality of resampled data points further comprises:
determining a first set of sampled data points from the plurality of sampled data points;
resampling a first data point from the first set of sampled data points, the first data point associated with a first time;
determining a second set of sampled data points from the plurality of sampled data points by removing at least one sampled data point from the first set of sampled data points, the at least one sampled data point chronologically before the first time associated with the first data point; and
resampling a second data point from the second set of sampled data points, the second data point associated with a second time that is chronologically at the same time as, or after, the first time associated with the first data point.

9. The method as recited in claim 1, wherein the time series algorithm is an autoregressive integrated moving-average algorithm.

10. A method of predicting a future dataset, comprising:
identifying by at least one processor, a base dataset comprising a plurality of sampled data points organized in a chronological order;
randomly resampling, by the at least one processor for a resampled dataset from a plurality of resampled datasets, the plurality of sampled data points while maintaining the chronological order of the plurality of sampled data points to obtain a plurality of resampled data points, wherein randomly resampling the plurality of sampled data points comprises randomly resampling a first sampled data point and, for each subsequent resampled data point from the resampled dataset, randomly resampling a data point from a subset of the plurality of sampled data points that is chronologically after a most recent resampled data point preceding the resampled data point in the resampled dataset; and
generating, by the at least one processor, a predicted future dataset by applying a time series algorithm to the plurality of resampled datasets.

11. The method as recited in claim 10, wherein randomly resampling the plurality of sampled data points comprises:

randomly resampling a first subset of the base dataset to obtain a first group of resampled data points for a particular resampled dataset; and randomly resampling a second subset of the base dataset to obtain a second group of resampled data points for the particular resampled dataset, wherein at least a portion of the second subset of the base dataset is chronologically ordered after the first subset.

12. The method as recited in claim 10, wherein generating the predicted future dataset further comprises applying different weights to the plurality of resampled data points in the plurality of resampled datasets based on a chronological position of the plurality of resampled data points.

13. The method as recited in claim 10, wherein generating the predicted future dataset further comprises:

generating, for a particular future time, a plurality of possible future data points, wherein generating the plurality of possible future data points comprises generating each of the plurality of possible future data points using a different one of the plurality of resampled datasets; and determining a mean of the plurality of possible future data points to obtain a predicted future data point corresponding to the particular future time.

14. The method as recited in claim 10, further comprising:

applying a jackknife-resampling algorithm to a training dataset; and adjusting a mean-squared error for the predicted future dataset by setting a plurality of variables of the time series algorithm based on a result of the jackknife-resampling algorithm.

15. The method as recited in claim 10, wherein the time series algorithm is an autoregressive integrated moving-average algorithm.

16. A system for predictive analytics, comprising:

at least one processor;

at least one non-transitory computer readable storage medium storing instructions thereon, that, when executed by the at least one processor, cause the system to:

identify a base dataset comprising a plurality of sampled data points describing a set of events, wherein the plurality of sampled data points comprise a chronological order in the base dataset;

randomly resample the plurality of sampled data points to obtain a plurality of resampled data points, wherein randomly resampling the plurality of sampled data points comprises randomly resampling a first sampled data point and, for each subsequent resampled data point from the plurality of resampled data points, randomly resampling a data point from a subset of the plurality of sampled data points that is chronologically at the same time as, or after, a most recent resampled data point preceding the resampled data point;

generate a plurality of resampled datasets comprising the plurality of randomly resampled data points while maintaining the chronological order from of the plurality of sampled data points; and predict, by at least one processor, a set of data points corresponding to future events by applying a time series algorithm to the plurality of resampled datasets.

17. The system as recited in claim 16, further comprising instructions that when executed by the at least one processor, cause the system to:

randomly resample a first subset of the plurality of sampled data points in the base dataset to obtain a first group of resampled data points for a particular resampled dataset; and randomly resample a second subset of the plurality of sampled data points in the base dataset to obtain a second group of resampled data points for the particular resampled dataset, wherein at least some of the plurality of sampled data points in the second subset of the base dataset are chronologically ordered after a final data point in the first subset of the base dataset.

18. The system as recited in claim 17, further comprising instructions that when executed by the at least one processor, cause the system to:

generate, for a particular future time, a plurality of possible future data points, wherein generating the plurality of possible future data points comprises generating each of the plurality of possible future data points using a different one of the plurality of resampled datasets; and average the plurality of possible future data points to obtain an estimated future data point corresponding to the particular future time.

19. The system as recited in claim 16, further comprising instructions that, when executed by the at least one processor, cause the system to predict the set of data points corresponding to future events by applying different weights to the plurality of resampled data points in the plurality of resampled datasets based on a chronological position of the plurality of resampled data points.

20. The system as recited in claim 16, wherein the plurality of resampled data points are in chronological order within each of the plurality of resampled datasets.

* * * * *